US008245932B2

(12) United States Patent
Gouelibo et al.

(10) Patent No.: US 8,245,932 B2
(45) Date of Patent: Aug. 21, 2012

(54) METHOD OF READING AT LEAST ONE BAR CODE AND SYSTEM FOR READING A BAR CODE

(75) Inventors: Didier Gouelibo, Cernay la Ville (FR); Sandrine Rancien, La Murette (FR)

(73) Assignees: Arjowiggins, Issy les Moulneaux (FR); Arjowiggins Security, Issy les Moulneaux (FR)

( * ) Notice: Subject to any disclaimer, the term of this patent is extended or adjusted under 35 U.S.C. 154(b) by 799 days.

(21) Appl. No.: 12/293,060

(22) PCT Filed: Apr. 2, 2007

(86) PCT No.: PCT/FR2007/051050
§ 371 (c)(1),
(2), (4) Date: Mar. 12, 2009

(87) PCT Pub. No.: WO2007/113448
PCT Pub. Date: Oct. 11, 2007

(65) Prior Publication Data
US 2009/0188970 A1 Jul. 30, 2009

(30) Foreign Application Priority Data
Mar. 31, 2006 (FR) ..................... 06 51147

(51) Int. Cl.
*G06K 7/10* (2006.01)

(52) U.S. Cl. ............... 235/462.01; 235/487; 235/385
(58) Field of Classification Search .......... 235/487, 235/492, 382, 382.5, 375, 462.01, 462.13, 235/383, 385
See application file for complete search history.

(56) References Cited

U.S. PATENT DOCUMENTS

| 6,348,853 | B1 | 2/2002 | Rührig |
| 6,824,061 | B1 | 11/2004 | Hattersley et al. |
| 2004/0153649 | A1* | 8/2004 | Rhoads et al. ............... 713/176 |
| 2004/0211844 | A1 | 10/2004 | Marshall |
| 2005/0087603 | A1* | 4/2005 | Koenck et al. ........... 235/472.02 |
| 2005/0178832 | A1 | 8/2005 | Higuchi |

(Continued)

FOREIGN PATENT DOCUMENTS
EP 0 656 607 A2 6/1995
(Continued)

OTHER PUBLICATIONS

Russian Office Action issued in Russian Patent Application No. 2008142687/08 dated Mar. 9, 2011 (with partial translation).

*Primary Examiner* — Karl D Frech
(74) *Attorney, Agent, or Firm* — Oliff & Berridge, PLC

(57) ABSTRACT

A method of reading at least one bar code carried by a substrate, the method including: a) generating, especially in an automatic manner, when presenting the bar code to a system for reading the bar code, at least one authentication cue related to an intrinsic physical characteristic of the substrate and independent of the data contained in the bar code, and b) allowing the reading of the bar code, only in the event of a positive authentication of the substrate or reading the bar code regardless of the result of the authentication of the substrate and in the event of negative authentication of the substrate, preventing access to just one part of the data contained in the bar code and/or to any data that may be associated with the bar code, and which is stored on a separate data medium from the substrate.

33 Claims, 3 Drawing Sheets

U.S. PATENT DOCUMENTS

Figure 1:
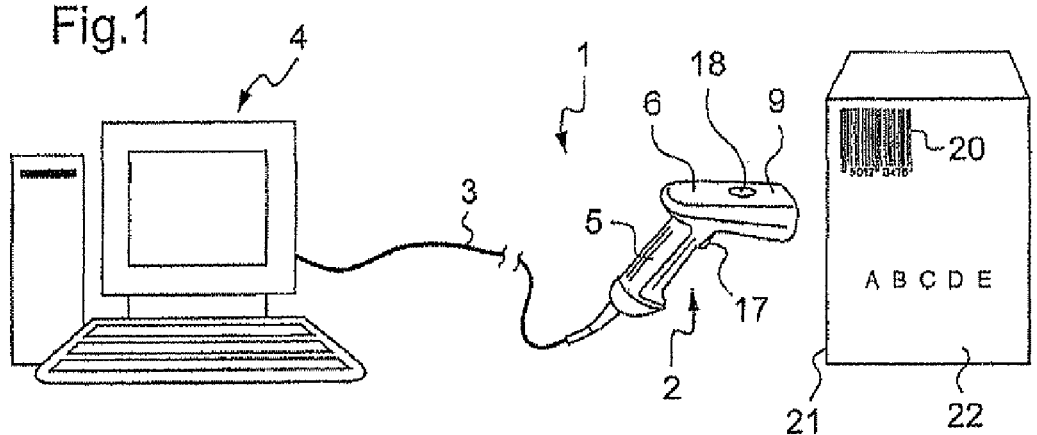

| | | |
|---|---|---|
| 2005/0255599 A1 | 11/2005 | Wang et al. |
| 2006/0022059 A1 | 2/2006 | Juds |

FOREIGN PATENT DOCUMENTS

| | | |
|---|---|---|
| EP | 0 907 143 A2 | 4/1999 |
| EP | 1 380 982 A1 | 1/2004 |
| RU | 2 043 201 C1 | 9/1995 |
| WO | WO 01/28781 A1 | 4/2001 |
| WO | WO 01/67375 A1 | 9/2001 |
| WO | WO 03/019502 A1 | 3/2003 |
| WO | WO 03/081522 A2 | 10/2003 |
| WO | WO 2005/088517 A1 | 9/2005 |

* cited by examiner

METHOD OF READING AT LEAST ONE BAR CODE AND SYSTEM FOR READING A BAR CODE

The subject of the present invention is in particular a method of reading at least one bar code that a substrate has and a bar code reading system.

From the international application WO 03/081522 a method is known for the simultaneous identification and authentication of an article comprising a bar code and at least one luminescent printed area, for example in a manner adjacent to the bar code. The bar code reader comprises a diode emitting a laser beam of a predetermined wavelength that scans the bar code and the luminescent area during the reading of the code. The reader comprises a standard system for analyzing the light reflected and absorbed by the black and white bars of the bar code and also a second detector of the fluorescence emitted by the luminescent area. This method enables the security of the article to be improved as it prevents the reproduction of bar codes simply by photocopying due to the presence of the luminescent area. However, this method does not prevent reproduction of the luminescent area by printing with luminescent compounds.

The international application WO 01/28781 describes a label comprising a bar code, the bars of which are produced with a mixture of an ink sensitive to UV radiation and an ink sensitive to IR radiation. This bar code is invisible to the naked eye in ambient light. The reading of the bar code is carried out through exposure to a diffuse UV light source. An additional verification is carried out with the help of an IR beam allowing the presence of the ink sensitive to IR radiation to be revealed.

The U.S. Pat. No. 6,824,061 discloses a device for reading fluorescent or phosphorescent 2D bar codes.

The patent application US 2005/0178832 describes a book comprising, on the one hand, an RFID (Radio Frequency Identification) device positioned on the rear flap of the cover of the book and, on the other hand, a bar code printed on one page of the book in such a way that this bar code juxtaposes itself to the RFID device. The reading of the bar code accompanies that of the RFID device. The presence of the RFID device allows the security of the book to be enhanced, but entails additional cost.

Generally speaking, the printing of a bar code onto a substrate, for example made of paper or of plastic, can be carried out in a relatively straightforward manner, at relatively low cost, which has enabled bar codes to spread widely into many fields.

However, as indicated above, a bar code can easily be reproduced, for example by photocopying.

The present invention aims in particular to enhance the protection of a bar code against a reproduction attempt by linking the bar code to the substrate bearing the code.

The subject of the invention, according to one of its aspects, is thus a method of reading at least one bar code borne by a substrate, the method comprising steps consisting in:

a) generating, when a bar code is presented to a bar code reader system, especially automatically, at least one piece of authentication information linked with an intrinsic physical characteristic of the substrate and independent of the data contained in the bar code; and b) allowing the reading of the bar code, optionally only in the case of positive authentication of the substrate.

In one example of implementation of the invention, the reading of the bar code takes place whatever the result of the authentication of the substrate.

As a variant, the reading of the bar code takes place only in the case of positive authentication of the substrate.

The authentication of the substrate may rely, for example, on a comparison of the authentication information with at least one piece of reference information, which is, for example, stored on a data medium distinct from the substrate.

The invention is able to enhance security by making the bar code reading subject to verification of the authenticity of the associated substrate.

For example, a fraudulent reproduction, especially by photocopying, of the bar code on a substrate not having the expected intrinsic physical characteristic can easily be detected the moment the bar code is read.

When the method comprises reading of the bar code whatever the result of the authentication of the substrate, the authentication of the substrate and the bar code reading can be carried out simultaneously. As a variant, the authentication of the substrate may be carried out before or after a bar code reading.

In one example of the implementation of the invention, the method comprises the step of reading the bar code whatever the result of the authentication of the substrate and in addition the following step:

permitting access, during the reading of the bar code, to all the data contained in the bar code and optionally to data associated with the bar code, stored on a data medium distinct from the substrate, this data medium being, for example, a computer memory.

As a variant, the method may comprise the following step:

preventing, in the case of negative authentication of the substrate, access to part of the data contained in the bar code and/or to data possibly associated with the bar code, stored on a data medium distinct from the substrate.

Hence, even if reading of the bar code is permitted in the case of negative authentication of the substrate, only certain data stored on the bar code or associated with this bar code are accessible, the other data, the most sensitive data for example, being accessible only in the case of positive authentication of the substrate.

The method may, if desired, comprise the following step:

in the case of negative authentication of the substrate, generating a warning, in particular a visual or sound warning.

In one example of the implementation of the invention, the method comprises the following steps:

allowing the storage of data associated with the bar code on a data medium, especially one distinct from the substrate;

in the case of negative authentication of the substrate, storing on said data medium at least one piece of data having a link with the negative authentication of the substrate.

This allows, for example, association of the bar code with a piece of data making the bar code subsequently unusable.

The method may comprise the following step:

making an action relating to the later processing of the substrate dependent on authentication of the substrate.

For example, the method may comprise the following step:

in the case of negative authentication of the substrate, transferring the substrate, especially automatically, for example using a conveyor or sorting device, to a storage location where substrates whose authenticity has not been validated are stored.

The method may comprise at least one of the following steps:

in the case of negative authentication of the substrate, altering the bar code, especially in a way preventing later reading of the bar code, for example by producing a mark, especially a visible and/or irreversible mark, on the bar code;

in the case of positive authentication of the substrate, producing an irreversible or temporary mark, especially a visible one, on the substrate, for example on or next to the bar code, enabling, for example, access control to an exhibition or show, or enabling provision of a cancellation mark in the case, for example, of a transport ticket.

In one example of the implementation of the invention, the intrinsic physical characteristic of the substrate is linked with at least one heterogeneity in the substrate.

For example, when the substrate is made of fibrous material heterogeneities may be generated during formation in the wet phase of the substrate.

These heterogeneities may correspond to fluctuations in the density of the substrate, for example to areas of lower density than that of the rest of the substrate.

The heterogeneities may, for example, form light patches visible in transmitted light.

The authentication information is, for example, linked with the position, size or density per unit surface or volume of the heterogeneities.

When the substrate comprises at least one base layer and a coating, the heterogeneities may, for example, be formed in the coating during its application on the base layer, the heterogeneities corresponding, for example, to fluctuations in the density of the coating.

The coating is, for example, an iridescent coating.

When the substrate is made of plastic, the heterogeneities correspond, for example, to lacks of material or to gas bubbles in the plastic.

As a variant, the heterogeneities may be formed by the microstructure of the substrate surface, especially when this is made of paper.

In another example of the implementation of the invention, the substrate comprises at least one security element dispersed within the bulk of the substrate, especially in a random manner, the intrinsic physical characteristic of the substrate being linked with this or these security element(s).

The security elements may be:

an active material such as, for example, a UV-absorbent chemical substance or elements detectable by X fluorescence;

a particle, especially a luminescent and/or fluorescent one;

a fiber such as a magnetic fiber, especially weakly magnetized, or a fiber that is optically excitable, especially through exposure to IR radiation; and a small board.

The intrinsic physical characteristic may correspond, for example, to at least one optical, electromagnetic, electrical, magnetic, thermal or acoustic characteristic of the substrate.

The aforementioned security elements may be set up to emit a specific signal when they are subjected to an external excitation, especially an optronic, electromagnetic, electrical, magnetic, thermal or acoustic one.

The intrinsic physical characteristic of the substrate serving to authenticate it may, if appropriate, be variable over time, due, for example, to a remanence phenomenon, when the substrate is subjected to an external excitation.

In one example of the implementation of the invention, the method comprises the following steps:

subjecting the substrate to a first electromagnetic excitation with a first wavelength, for example UV radiation, with a view to verifying the authenticity of the substrate;

reading the bar code by subjecting it to a second electromagnetic excitation with a second wavelength different from the first, for example visible luminous radiation, for example red.

In one example of the implementation of the invention, the intrinsic physical characteristic of the substrate is detected in a substrate inspection area, this inspection area possibly being, for example, at least partly delimited by the bar code. The inspection area has a surface smaller than the total surface of the substrate.

As a variant, the intrinsic physical characteristic of the substrate is detected over the entire surface of the substrate.

The detection of the intrinsic physical characteristic with a view to authentication of the substrate may be static, being based on a predetermined inspection area of the substrate, or, as a variant, dynamic, being based on the scanning of at least one area of the substrate, especially using luminous radiation of a predetermined wavelength.

The bar code may be arranged to be visible to the naked eye in ambient light.

As a variant, the bar code may be invisible to the naked eye in ambient light and be produced, for example, using an ink that is excitable under UV or IR radiation.

The bar code may be obtained, for example, by direct thermal printing, thermal transfer, matrix transfer, marking, for example by laser technology, especially using a YAG laser, a blue laser, or a UV laser.

The bar code may contain, if appropriate, encrypted data.

The bar code may be numerical in type, such as for example an EAN8, EAN13, UPC or ISBN code, or alphanumeric, such as Code 39 or Code 128 for example.

The bar code may be a 2D code, for example of the type PDF 417, DataMatrix, Maxicode or QR Code.

As examples of bar codes it is also possible to mention the PDB™ code marketed by De La Rue or the 2D Superscript code marketed by Datastrip.

The bar code may be produced, if desired, using a magnetic ink. Such a code is, for example, a CMC7 code.

In one example of the implementation of the invention, the method allows the reading of two bar codes, especially identical ones, respectively borne by two substrates, these substrates preferably having different security elements, the method comprising the following steps:

generating, for each of the substrates, at least one piece of authentication information linked with an intrinsic physical characteristic of the substrate;

allowing the reading of the bar codes only in the case of positive authentication of the two substrates; or allowing the reading of at least one bar code, especially of the two bar codes, whatever the result of the authentication of the substrates.

The protection of the bar code can thus be enhanced because of two different authentication operations based on different security elements.

One of the substrates is, for example, formed by packaging and the other substrate by a label attached to the packaging.

The authenticity of the packaging is concluded when this and the label are both authenticated.

In one example of the implementation of the invention, the substrate is associated with an article, for example an item of clothing, and the method comprises the following steps:
- generating a piece of authentication information for the article linked with an intrinsic physical characteristic of the article; and
- reaching a conclusion with regard to the counterfeiting and/or the provenance of the article on the basis of the authentication of the substrate bearing the bar code and that of the article.

The substrate may be arranged to form, for example, one of the following elements:
- a security and/or value document, for example a check, an identity paper, a label, an admission ticket to a show or a transport ticket;
- packaging, for example a packing box.

The substrate may comprise at least one layer of paper or, as a variant, a layer made of plastic.

The subject of the invention is also, according to another of its aspects, an assembly comprising at least two substrates, each comprising a bar code, one of the substrates, for example a label, being attached to the other substrate, for example packaging.

The substrates may have different security elements.

The bar codes of the two substrates may, where appropriate, be identical.

The subject of the invention is also, according to another of its aspects, an assembly comprising an article, for example an item of clothing, and a substrate associated with this article, the substrate comprising a bar code, forming a label for example and in particular being attached to the article.

At least one of the portions of the article and the substrate may comprise security elements, especially identical ones, serving to authenticate the article and the substrate.

The subject of the invention is also, according to another of its aspects, a bar code reading system comprising:
- a bar code reading unit, especially of optical and/or magnetic type;
- an authentication unit set up to detect at least one intrinsic physical characteristic of a substrate, independently of the data contained in the bar code.

The authentication unit may comprise at least one of an excitation source and an optical, electromagnetic, electrical, magnetic, thermal or acoustic detector.

The authentication unit may also comprise a first source of luminous radiation of a first wavelength and the reading unit a second source of luminous radiation of a second wavelength different from the first.

As a variant, the authentication and reading units use a common source of luminous radiation.

The system may be set up to emit a warning, especially a visual or sound warning, in the case of negative authentication of a substrate.

The system may comprise, for example, a warning light set up to come on in the case of negative authentication of the substrate, or emit light of a first color, for example green, in the case of positive authentication of the substrate, and light of a second color, for example red, in the case of negative authentication.

The system may comprise a processing unit connected to the authentication and reading units and set up to instruct the bar code reading by the reading unit when the authentication of the substrate by the authentication unit is positive.

As a variant, the processing unit is set up to instruct the bar code reading by the reading unit whatever the result of the authentication of the substrate by the authentication unit, and in the case of negative authentication of the substrate to prevent access to only a part of the data contained in the bar code and/or to data possibly associated with the bar code, stored on a data medium distinct from the substrate.

The processing unit may also be set up to instruct the bar code reading by the reading unit whatever the result of the authentication of the substrate by the authentication unit, and in the case of negative authentication of the substrate to prevent access to only a part of the data contained in the bar code and/or to data possibly associated with the bar code, stored on a data medium distinct from the substrate.

The processing unit may also be set up to allow storing of data associated with the bar code on a data medium distinct from the substrate and in the case of negative authentication of the substrate, to store on said data medium at least one piece of data having a link with the negative authentication of the substrate.

The processing unit may also be set up to transfer, in the case of negative authentication of the substrate, especially automatically, the substrate (37) to a storage location where substrates whose authenticity has not been validated are stored.

The processing unit may furthermore be set up to alter the bar code, in the case of negative authentication of the substrate, especially by producing a mark on the bar code, especially a visible and/or irreversible one.

The processing unit may finally be set up to produce an irreversible or temporary mark, especially a visible one, on the substrate, especially on the bar code, in the case of positive authentication.

The reading system may, where appropriate, form a single piece of apparatus.

The authentication and reading units may, if desired, be located in a reading device, set up in particular to be able to be manually manipulated by a user, this reading device being held, for example, in one hand.

This reading device advantageously comprises at least one handle and may be connected to a processing unit by a wired connection or, as a variant, by a wireless connection.

The reading system may be set up, where appropriate, to allow authentication of the substrate and reading of the bar code without having to move the substrate in relation to the reading system between these two operations.

The reading system may be located, where appropriate, in a system for processing the substrate, equipped for example with a device for conveying the substrate, the reading and authentication units being located in particular one after the other, allowing the authentication and reading operations to be carried out successively.

In one example of the implementation of the invention, the authentication and reading units are housed in a device comprising an area for receiving the substrates to be processed, this device being set up in particular to be positioned permanently in one place in normal operation.

The subject of the invention is also, according to another of its aspects, an assembly comprising:
- a reading system such as defined above; and
- a substrate comprising a bar code, the data contained in the bar code being in particular independent of the intrinsic physical characteristics of the substrate.

The subject of the invention is also, according to another of its aspects, a method of reading at least one bar code borne by a substrate, the method comprising the following steps:
a) generating, when a bar code is presented to a bar code reader system, especially automatically, at least one piece of authentication information linked with an intrinsic physical characteristic of the substrate; and b) allowing the reading of the bar code only in the case of positive authentication of the authenticity of the substrate.

Figure 2:
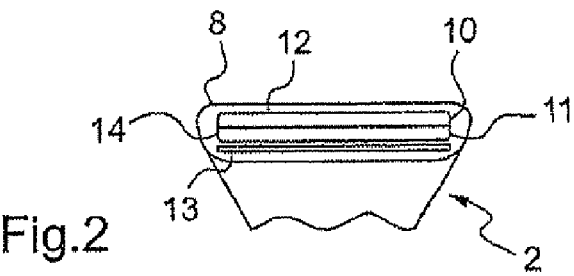
Figure 3:
Figure 4:
Figure 7:
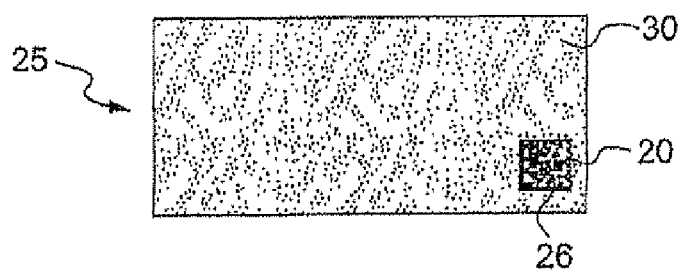
Figure 8:
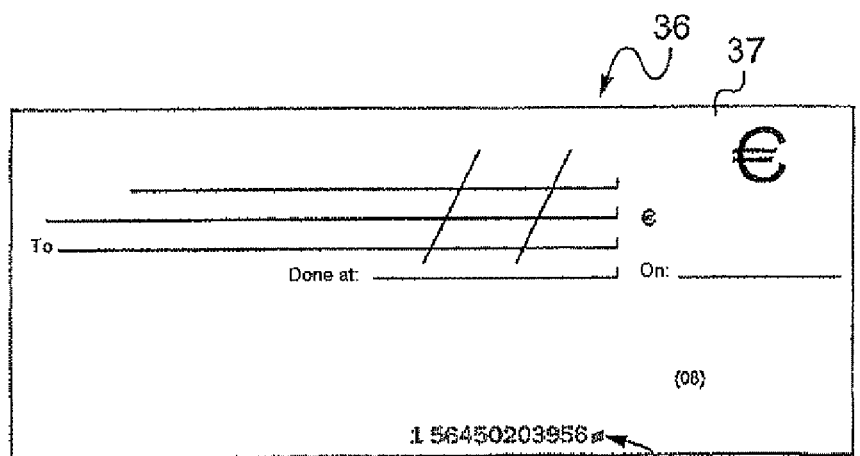
Figure 9:
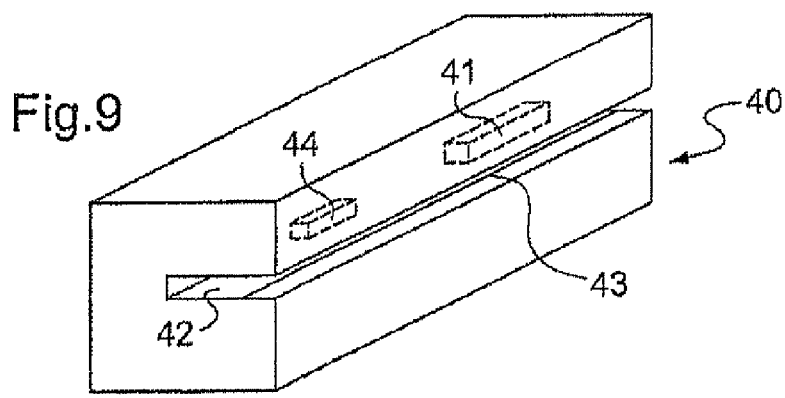
Figure 10:
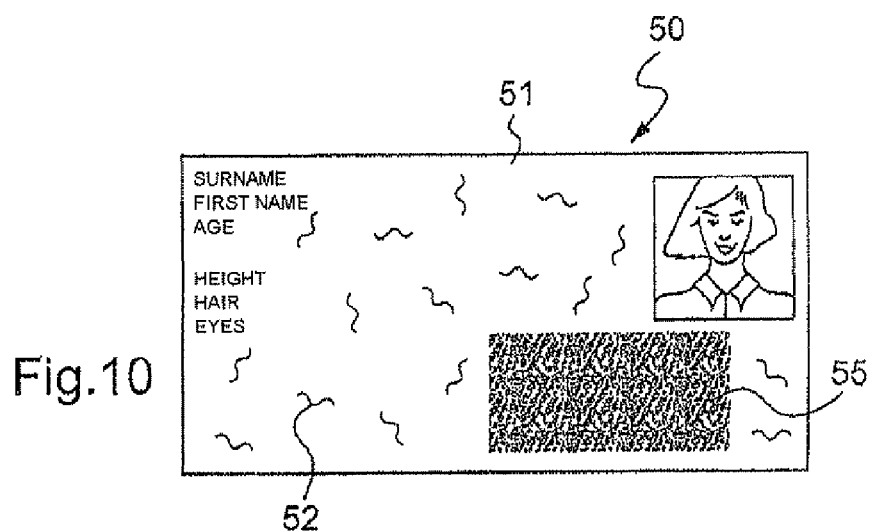
Figure 11:
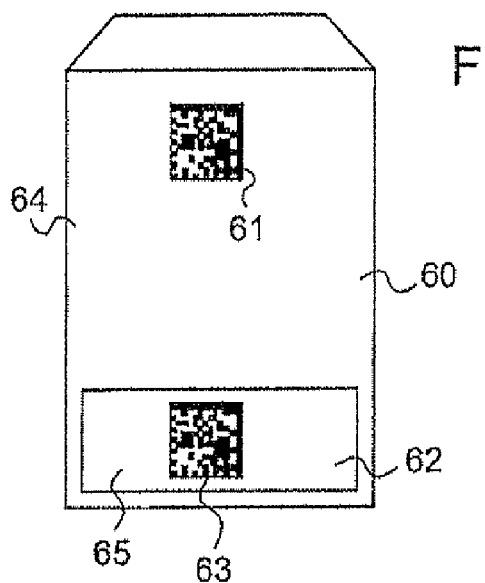
Figure 12:
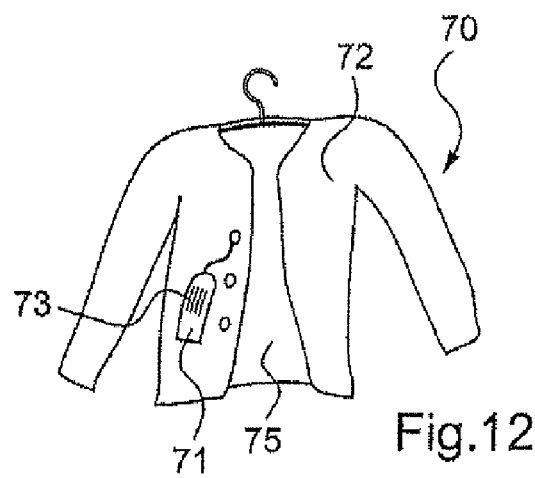
Figure 13:
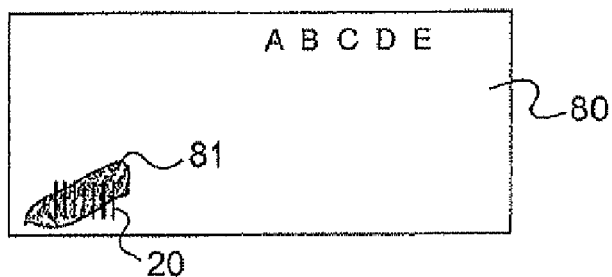
Figure 14:
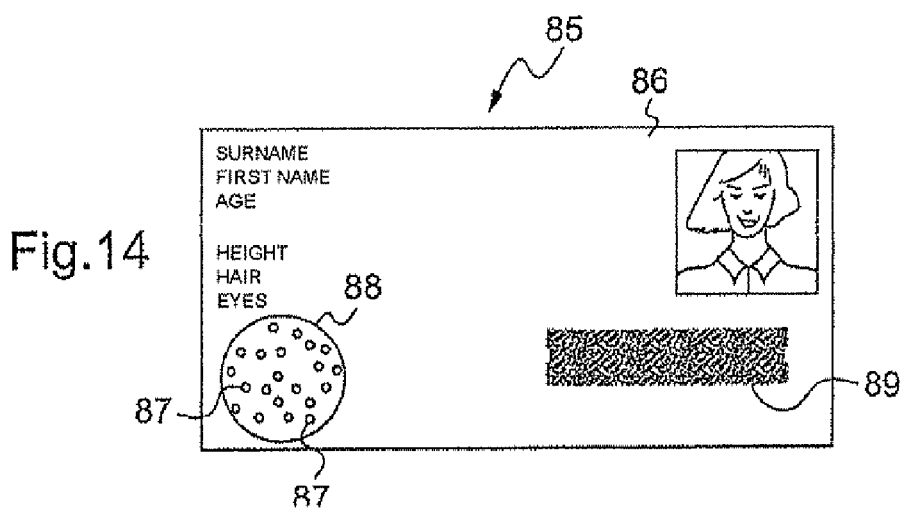

The present invention will be able to be understood better on reading the following detailed description of nonlimiting examples of the implementation of the invention, and on examining the appended drawing, in which:

FIG. 1 schematically and partially represents a bar code reading system according to the invention and packaging comprising a bar code;

FIG. 2 schematically and partially represents a reading device of the system of FIG. 1;

FIGS. 3 to 6 schematically and partially illustrate various examples of bar codes;

FIG. 7 schematically and partially represents a label comprising a bar code;

FIG. 8 schematically and partially represents a check comprising a CMC7 bar code;

FIG. 9 schematically and partially represents a reading system according to another exemplary implementation of the invention;

FIG. 10 schematically and partially represents an identity paper comprising a bar code;

FIG. 11 is a schematic and partial view of a packing box and of a label stuck to this box, each with a bar code;

FIG. 12 schematically and partially represents an item of clothing with a label attached to it;

FIG. 13 schematically and partially represents a substrate comprising an altered bar code; and FIG. 14 schematically and partially represents an identity document comprising a bar code.

EXAMPLE 1

FIG. 1 represents a reading system 1 enabling the reading of a bar code. This system 1 comprises a reading device 2 connected, for example, by a wired connection 3 to a processing unit 4, for example a computer.

The reading device 2 comprises a handle 5 allowing a user to manipulate it like a pistol.

In the example illustrated, the reading device 2 has a casing 9 defining a head 6 and the handle 5, this head 6 having a reading window 8, as illustrated in FIG. 2.

The reading device 2 comprises a bar code reading unit 10 and an authentication unit 11.

The reading device 2 may comprise a trigger 17 to start the reading of the bar code.

The reading unit 10 comprises, behind the reading window 8, a linear CCD sensor 12 to enable the light signals coming from a bar code 20 to be received when the latter is illuminated using an illumination source 13 of the reading device 2.

In the example considered, this illumination source 13 comprises, for example, one or more light emitting diodes (LEDs), emitting visible red light, for example of a wavelength of around 626 nm.

The sensor 12 enables reading of 1D or 2D bar codes at a relatively short distance, for example between 0 and 10 cm.

The authentication unit 11 comprises, behind the reading window 8, a detector 14, comprising for example a photodiode associated with a filter fitted to near IR radiation and optionally an optical fiber with a view to improving the collection of light.

The authentication unit 11 may comprise a microprocessor (not shown), set up to analyze characteristics, especially spectral characteristics, of the light collected by the detector 14.

The reading system 11 enables reading of a bar code 20 borne by a substrate 21 forming, in the example considered, a packing box 22, especially for a medicine, a cosmetic product or a food product, this list not being limiting.

The substrate 21 is, for example, paper-based and the bar code 20 may be affixed to this substrate 21 by thermal transfer.

As a variant, the bar code is produced on the substrate 21 by direct thermal printing, matrix transfer, marking, for example by laser technology, especially using a YAG laser, a blue laser, or a UV laser.

The bar code 20 is, for example, an EAN8, EAN13, UPC or ISBN bar code.

Figure 5:
Figure 6:

As a variant, the bar code may be a 2D bar code, for example of the type PDF 417 (see FIG. 4), DataMatrix (see FIG. 6), Maxicode (see FIG. 3) or QR Code (see FIG. 5).

2D codes can, for example, encode around 1 Mb if information.

The substrate 21 comprises security elements or tracers incorporated in its bulk during its manufacture.

The security elements are chosen so as to emit IR radiation with a specific spectrum when these security elements are excited by the visible red light used for reading the bar code 20.

These security elements comprise, for example, an active material such as that marketed under the name SecuSystem® by PitKit.

The illumination source 13 of the reading device 2 is used at the same time for reading the bar code 20 and for authenticating the substrate 21.

In the example considered, the processing unit 4 is set up to instruct the authentication of the substrate 21 by the authentication unit 11 simultaneously with the reading of a bar code 20 by the reading unit 10.

The reading of the bar code 20 is independent of the result of the authentication of the substrate 21.

The processing unit 4 is set up to allow the comparison of a piece of authentication information linked with an intrinsic physical characteristic of the substrate 21, defined, in the example considered, by the spectrum of IR radiation emitted by the security elements and collected by the detector 14, with a piece of reference information, in particular a reference spectrum, in order to decide on the authenticity of the substrate 21.

The processing unit 4 may be set up to allow access, on each reading of a bar code, to data stored on the bar code 20, independently of the result of the authentication of the substrate 21.

The processing unit may also, whatever the result of the authentication of the substrate, allow access to complementary data associated with the bar code read, stored on a data medium distinct from the substrate 21, for example in a memory of the processing unit 7.

The reading device 2 may comprise one or more warning lights 18, located on the outside of the casing 9 and set up to emit light of a first color, for example green, in the case of positive authentication of the substrate 21, and of a second color, for example red, in the case of negative authentication.

EXAMPLE 2

FIG. 7 represents an adhesive label 25 formed by a substrate 30 bearing a bar code 20, for example a 2D bar code such as a DataMatrix code.

The label 25 is, for example, plastic-based and arranged so as to be altered in case of attempted removal of this label 25 from a support to which it is stuck.

Such a label 25 may be similar to an STES label marketed by Arjowiggins.

The substrate 30 comprises in its bulk for example security elements that are fluorescent under excitation by 365 nm UV radiation.

The fluorescence of these security elements is chosen so as not to affect the optical reading of the bar code 20.

These security elements are, for example, fluorescent particles that are yellow both in ambient light and under UV radiation, fibers that are blue in ambient light and have blue fluorescence under UV, or fibers that are invisible to the naked eye and have red fluorescence under UV.

The security elements are dispersed within the substrate 30 so as to be present in the area 26 covered by the bar code 20.

The reading of the bar code 20 and the authentication of the substrate 30 are carried out using a reading system (not shown) comprising:
- a first illumination source comprising, for example, an LED capable of emitting visible red radiation at 626 nm;
- a bar code reading unit with a bidirectional sensor set up to read both linear bar codes and 2D matrix bar codes under exposure to the first illumination source;
- a second illumination source, for example at least one LED, capable of emitting UV radiation at 365 nm, associated with a lens to focus the radiation from this second source into a point;
- a set of optical fibers with detectors and spectrophotometers set up to enable spectral decomposition of the visible radiation emitted by the substrate 30 under UV excitation by the second illumination source.

With a view to guaranteeing the confidentiality of alphanumeric data encoded in the bar code or of data associated with this bar code stored on a data medium distinct from the substrate 30, access to these data is, in the example considered, conditional on the authentication of the substrate.

In the case in which the spectral signature of the security elements present in the substrate 30, in particular in the inspection area 26, does not correspond to an expected reference spectral signature, the reading system instructs the emission of a warning, especially a visual or sound warning, in order to warn the user of the fact that the substrate 30 has not been authenticated correctly, and denies access to the alphanumeric data stored on or associated with the bar code.

EXAMPLE 3

With reference to FIG. 9 a reading system 40 will now be described which enables reading of a CMC7 type bar code from a document 36 such as a check, illustrated in FIG. 8.

The document 36 comprises a paper substrate 37 incorporating security elements such as, for example, tracers called Traceless® marketed by Creo, which are excitable under IR radiation.

The bar code 35 is printed using a magnetizable ink.

The reading system 40 comprises:
a reading unit 41 provided with:
- a scanner enabling optical reading of the bar code 35;
- a magnet and a magnetic reading head enabling magnetic reading of the bar code 35 when this is magnetized due to the magnet, the optical reading and the magnetic reading in particular being able to be carried out simultaneously;
a conveyor device 42 allowing the document 36 to be brought into a reading area 43 in line with the reading unit 41; and
an authentication unit 44 comprising, for example, an LED emitting in the IR spectrum, at the excitation wavelength of the security elements, and a bank of photodiodes with IR filters.

When the document 36 passes into the reading system 40, the authenticity of the substrate is verified based on the spectral signature generated by the security elements.

When the substrate 37 does not exhibit the expected spectral signature, the document 36 is considered to be forged or counterfeited and, thanks to a conveyor device (not shown), is transferred to a location where nonvalidated substrates are stored.

In the case of positive authentication of the substrate 37, the reading system 40 proceeds with the optical and magnetic reading of the bar code 35.

EXAMPLE 4

FIG. 10 represents a security and/or value document 50 such as an identity paper, comprising a substrate 51 containing metal fibers 52 having a specific magnetic response under excitation by a magnetic field.

The magnetic fibers 52, which are for example those marketed under the name Authentiber® by ACS, exhibit, for example, a weak magnetism and are detectable using an appropriate system developed by the same company. The detection is based on the analysis of the signal emitted by at least one metal fiber in an inspection area when the latter is exposed to an alternating magnetic field.

The document comprises a bar code 55 printed on the substrate 51 by laser marking, this code being, for example, a PDB™ code.

A reading system is provided for reading the bar code 55, this system being set up so as to allow reading of the bar code only in the case of positive authentication of the substrate.

The authentication of the substrate 51 is carried out by subjecting this substrate to a magnetic field and by comparing the magnetic signature measured with a reference signature.

EXAMPLE 5

FIG. 11 represents a packing box 60 having a bar code 61 produced by laser microperforation, and a label 62 on which a bar code 63 is printed that is identical with the bar code 61.

The label 63 is, for example, stuck onto an outer surface of the packing box 60.

The substrate 64 used for the packing box 60 comprises first security elements having a specific IR spectral response when these security elements are subjected to a visible red light at 630 nm.

The label 62 comprises a substrate 65 with second security elements exhibiting a different IR spectral signature in response to exposure to visible red light at 630 nm.

The reading of the bar codes 61 and 63 and the authentication of the substrates 64 and 65 are carried out using a reading system (not shown) comprising a reading device comprising:
- an illumination source comprising, for example, four 630 nm laser diodes;
- a 2D CMOS camera (660(h)×492(v) effective pixels); and
- two IR detectors with appropriate filters able to detect the spectral signatures of the first and second security elements.

The reading system verifies the authenticity of the substrates 64 and 65 and concludes that the assembly is authentic only when the two substrates 64 and 65 have been correctly authenticated.

EXAMPLE 6

FIG. 12 represents an assembly 70 comprising a label 71 attached to an article 72 such as an item of clothing.

The label 71 comprises, for example, a nonadhesive cardboard substrate and a printed bar code 73.

The substrate of the label 71 has an invisible marker such as, for example, that marketed by the Australian company DatatraceDNA. At least one portion of the article 72, for example the lining 75 of the item of clothing, has another marker, from the same company for example, introduced into the finishing resin of the lining. These two markers have a given spectral response when they are subjected to a specific wavelength of light.

A reading system (not shown) is provided for ensuring that the item of clothing has not been diverted to parallel markets, this diversion often being accompanied by a substitution of the original label by another with a different bar code.

The system also allows it to be ensured that the article 72 and the label 71 have not been counterfeited.

The reading system may comprise, for example, a scanner with omnidirectional scanning for reading the bar code 73 and an authentication unit comprising an excitation system at the excitation wavelength of the marker and a polygon turning with the detectors and allowing verification, during the reading of the bar code, of the presence of the security elements in the substrate of the label 71 and the article 72.

If the authenticity of the article 72 is verified, but not that of the label 71, the reading system concludes a diversion of the article 72 to a parallel market.

If the authenticity of the article 72 and that of the label 71 are not verified, the reading system concludes that the article 72 has been counterfeited.

In the two aforementioned cases a warning light is provided to warn the user.

The reading system may be set up to send information about the nonconformity of the article 72 and/or the label 71 automatically to a data medium on which data associated with the bar code 73 are stored.

EXAMPLE 7

In the example considered, in the case of negative verification of the authenticity of a substrate 80, the bar code 20 borne by this substrate 80 is altered so as to prevent subsequent reading of the bar code 20. This alteration may be carried out, for example, by producing a mark 81 on the bar code 20, especially with a visible and/or irreversible ink, as illustrated in FIG. 13, for example automatically with an appropriate marking device.

EXAMPLE 8

FIG. 14 shows an identity document 85 comprising a substrate 86 made of plastic.

This substrate 86 comprises in its bulk heterogeneities formed by lacks of material or bubbles 87.

These heterogeneities 87 may in particular be formed during the manufacture of the substrate 86.

This type of substrate 86 is, for example, marketed by the company Prooftag.

The bubbles 87, situated in an inspection area 88, define a unique signature associated with the substrate 86.

The document 85 comprises a bar code 89, for example of the 2Dsuperscript type marketed by the company Datastrip.

This bar code 89 contains encrypted data relating to the owner of the identity document 85 and to the signature of the substrate 86.

During an operation of reading the bar code 89, a reading of the signature in the inspection area 88 is carried out using an optical system set up, for example, to detect the position of the bubbles 87.

The signature obtained from the substrate 86 may be compared with that stored in the bar code 89.

If these signatures match, the document 85 and the bar code 89 are considered to be authentic.

The expression "comprising a" should be understood as being synonymous with the expression "comprising at least one", except where specified to the contrary.

The invention claimed is:

1. A method of reading at least one bar code borne by a substrate, the method comprising:
   a) generating, automatically, when a bar code is presented to a bar code reader system, at least one piece of authentication information linked with an intrinsic physical characteristic of the substrate and independent of the data contained in the bar code; and
   b) allowing the reading of the bar code only in the case of positive authentication of the substrate, or reading the bar code whatever the result of the authentication of the substrate and in the case of negative authentication of the substrate preventing access to only part of the data contained in the bar code and/or to data possibly associated with the bar code, stored on a data medium distinct from the substrate.

2. The method as claimed in claim 1, comprising reading the bar code only in the case of positive authentication of the substrate.

3. The method as claimed in claim 1, comprising reading the bar code whatever the result of the authentication of the substrate.

4. The method as claimed in claim 3, the authentication of the substrate and the bar code reading being carried out simultaneously.

5. The method as claimed in claim 1, the authentication of the substrate being carried out before a bar code reading.

6. The method as claimed in claim 1, comprising:
   permitting access, in the case of positive authentication of the substrate, to data associated with the bar code, stored on a data medium distinct from the substrate.

7. The method as claimed in claim 1, comprising reading the bar code whatever the result of the authentication of the substrate, and
   preventing, in the case of negative authentication of the substrate, access to part of the data contained in the bar code and/or to data possibly associated with the bar code, stored on a data medium distinct from the substrate.

8. The method as claimed in claim 1, comprising:
   in the case of negative authentication of the substrate, generating a warning.

9. The method as claimed in claim 1, comprising:
   allowing the storage of data associated with the bar code on a data medium distinct from the substrate;
   in the case of negative authentication of the substrate, storing on said data medium at least one piece of data having a link with the negative authentication of the substrate.

10. The method as claimed in claim 1, comprising:
making an action relating to the later processing of the substrate dependent on authentication of the substrate.

11. The method as claimed in claim 10, comprising:
in the case of negative authentication of the substrate, transferring the substrate automatically to a storage location where substrates whose authenticity has not been validated are stored.

12. The method as claimed in claim 1, comprising:
in the case of negative authentication of the substrate, altering the bar code in a way preventing later reading of the bar code by producing a visible and/or irreversible mark on the bar code.

13. The method as claimed in claim 1, comprising:
in the case of positive authentication of the substrate, producing an irreversible or temporary visible mark on the bar code.

14. The method as claimed in claim 1, the intrinsic physical characteristic of the substrate being linked with at least one heterogeneity in the substrate.

15. The method as claimed in claim 1, the substrate comprising at least one security element dispersed within the bulk of the substrate in a random manner, the intrinsic physical characteristic of the substrate being linked with at least part of the security elements.

16. The method as claimed in claim 15, the security element being chosen from:
a UV-absorbent chemical substance or elements detectable by X fluorescence;
a luminescent and/or fluorescent particle;
a magnetic fiber or a fiber that is optically excitable; and
a small board.

17. The method as claimed in claim 1, the intrinsic physical characteristic corresponding to at least one optical, electromagnetic, electrical, magnetic, thermal or acoustic characteristic of the substrate.

18. The method as claimed in claim 1, comprising:
subjecting the substrate to a first electromagnetic excitation with a first wavelength, especially UV radiation, with a view to verifying the authenticity of the substrate;
reading the bar code by subjecting it to a second electromagnetic excitation with a second wavelength different from the first.

19. The method as claimed in claim 1, the bar code being configured so as to be invisible to the naked eye in ambient light.

20. The method as claimed in claim 1, for the reading of two bar codes, respectively borne by two substrates, these substrates having different security elements, the method comprising:
generating, for each of the substrates, at least one piece of information linked with an intrinsic physical characteristic of the substrate;
allowing the reading of the bar codes only in the case of positive authentication of the two substrates; or
allowing the reading of at least one bar code, especially of the two bar codes, whatever the result of the authentication of the substrates.

21. The method as claimed in claim 1, the substrate being associated with an article, the method comprising:
generating a piece of authentication information for the article linked with an intrinsic physical characteristic of the article; and
reaching a conclusion with regard to the counterfeiting and/or the provenance of the article on the basis of the authentication of the substrate bearing the bar code and that of the article.

22. The method as claimed in claim 1, the substrate being configured to form one of the following elements:
a security and/or value document, an identity paper, a label, an admission ticket to a show or a transport ticket;
packaging.

23. A bar code reading system, comprising:
a bar code reading unit;
an authentication unit set up to detect at least one intrinsic physical characteristic of a substrate, independently of the data contained in the bar code;
a processing unit connected to the authentication and reading units and set up to instruct the bar code reading by the reading unit only when the authentication of the substrate by the authentication unit is positive, or whatever the result of the authentication of the substrate by the authentication unit, and in the case of negative authentication of the substrate to prevent access to only a part of the data contained in the bar code and/or to data possibly associated with the bar code, stored on a data medium distinct from the substrate;
the authentication and reading units being located in a reading device.

24. The system as claimed in claim 23, the authentication unit comprising at least one of an excitation source and an optical, electromagnetic, electrical, magnetic, thermal or acoustic detector.

25. The system as claimed in claim 23, the authentication unit comprising a first source of luminous radiation of a first wavelength and the reading unit a second source of luminous radiation of a second wavelength different from the first.

26. The system as claimed in claim 23, set up to emit a warning, in the case of negative authentication of a substrate.

27. The system as claimed in claim 23, the processing unit being set up to instruct the reading of the bar code by the reading unit when the authentication of the substrate by the authentication unit is positive.

28. The system as claimed in claim 23, the processing unit being set up to instruct the reading of the bar code by the reading unit whatever the result of the authentication of the substrate by the authentication unit, and in the case of negative authentication of the substrate to prevent access to only a part of the data contained in the bar code and/or to data possibly associated with the bar code, stored on a data medium distinct from the substrate.

29. The system as claimed in claim 23, the reading device being set up to be able to be manually manipulated by a user, this reading device being held in one hand.

30. The system as claimed in claim 23, the processing unit being set up to allow storing of data associated with the bar code on a data medium distinct from the substrate and in the case of negative authentication of the substrate, to store on said data medium at least one piece of data having a link with the negative authentication of the substrate.

31. The system as claimed in claim 23, the processing unit being set up to transfer automatically, in the case of negative authentication of the substrate, the substrate to a storage location where substrates whose authenticity has not been validated are stored.

32. The system as claimed in claim 23, the processing unit being set up to alter the bar code, in the case of negative authentication of the substrate by producing a visible and/or irreversible mark on the bar code.

33. The system as claimed in claim 23, the processing unit being set up to produce an irreversible or temporary mark on the bar code in the case of positive authentication.

* * * * *